US012650837B1

(12) United States Patent
Kachewar et al.

(10) Patent No.: US 12,650,837 B1
(45) Date of Patent: Jun. 9, 2026

(54) DE-CENTRALIZED DISTRIBUTED RPA BOT SYSTEM

(71) Applicant: Amazon Technologies, Inc., Seattle, WA (US)

(72) Inventors: Rohan Rajendra Kachewar, Maharashtra (IN); Soumadipta Roy, Telangana (IN); Mukesh Jagannath Kale, Maharashtra (IN)

(73) Assignee: Amazon Technologies, Inc., Seattle, WA (US)

( * ) Notice: Subject to any disclaimer, the term of this patent is extended or adjusted under 35 U.S.C. 154(b) by 1379 days.

(21) Appl. No.: 17/218,016

(22) Filed: Mar. 30, 2021

(51) Int. Cl.
*G06F 8/77* (2018.01)
*G06F 8/36* (2018.01)
*G06F 8/61* (2018.01)

(52) U.S. Cl.
CPC ................. *G06F 8/77* (2013.01); *G06F 8/36* (2013.01); *G06F 8/61* (2013.01)

(58) Field of Classification Search
CPC ................. G06F 8/77; G06F 8/36; G06F 8/61
See application file for complete search history.

(56) References Cited

U.S. PATENT DOCUMENTS

| | | | | |
|---|---|---|---|---|
| 8,533,170 | B1 * | 9/2013 | McHugh ............. | G06F 16/1873 707/695 |
| 9,823,922 | B1 * | 11/2017 | Carmack ................... | G06F 8/73 |
| 10,187,427 | B2 * | 1/2019 | Banerjee ............. | H04L 63/0245 |
| 10,452,674 | B2 | 10/2019 | Diwan et al. | |
| 11,301,224 | B1 * | 4/2022 | Dabhi ................... | G06F 9/4881 |
| 2014/0317174 | A1 * | 10/2014 | Feng ....................... | H04L 67/01 709/203 |
| 2019/0303779 | A1 * | 10/2019 | Van Briggle ........... | G06F 9/485 |
| 2021/0357236 | A1 * | 11/2021 | Cohen ...................... | G06F 8/34 |
| 2021/0365260 | A1 * | 11/2021 | Jain ....................... | G06F 9/5027 |
| 2022/0066422 | A1 * | 3/2022 | Kunnath ................ | G06F 9/451 |

OTHER PUBLICATIONS

Hofmann, Peter, Caroline Samp, and Nils Urbach. "Robotic process automation." Electronic markets 30.1 (2020): 99-106. (Year: 2020).*

(Continued)

*Primary Examiner* — Bradley A Teets
*Assistant Examiner* — Joanne G Macasiano
(74) *Attorney, Agent, or Firm* — Robert C. Kowert; Kowert, Hood, Munyon, Rankin & Goetzel, P.C.

(57) ABSTRACT

A de-centralized distributed bot system for deployment of automation bots includes distributed agents that execute on client devices, such as desktop machines or the like. The agents poll a remote repository that stores the bots to discover new bots to download to storage local to the agent, or updates for bots the agent has already locally-cached. The agents each have an agent-based user interface for browsing and managing bots, such as the bots in the local cache. In response to selection, via the agent-provided interface, of a bot for execution, an executable for the selected bot is obtained and locally executed. The agent may generate related logs and transmit the logs to a metrics, analytics and alarm service. Bot developers may submit bots to the remote repository for storage via a deployment pipeline service that submits bots to the remote repository using a publishing manager.

20 Claims, 13 Drawing Sheets

(56)                    References Cited

OTHER PUBLICATIONS

Kiilunen, Jan. "Automating project management with RPA." (2020). https://www.theseus.fi/handle/10024/343087. Retrieved Aug. 16, 2025 (Year: 2020).*

Orynbayeva, Altynay. "A governance model for managing Robotics Process Automation (RPA)." Delft University of Technology. Pro gradu. Viitattu 25 (2019) (Year: 2019).*

UiPath, "Deplay and manage your robot workforce at enterprise scale", Retrieved from https://www.uipath.com/product/orchestrator on Mar. 25, 2021, pp. 1-11.

AWS, "What is AWS RoboMaker?", Retrieved from https://docs.aws.amazon.com/robomaker/latest/dg/what-is-robomaker.html on Mar. 25, 2021, p. 1.

* cited by examiner

DE-CENTRALIZED DISTRIBUTED RPA BOT SYSTEM

BACKGROUND

Conventional architecture in the field of Robotic Process Automation (RPA) can be described as a centralized server and thin-client desktop-based model. Some such models require a complex communication protocol between the desktop agent and the server (e.g., sometimes referred to as an orchestration server or platform). For example, in the centralized server (e.g., a web-based server) and thin-client desktop-based model, the centralized server provides at least the following roles and responsibilities: 1. A user interface for a user to browse and select automation to be executed in attended mode, 2. Deployment of automated activity from the centralized server to a desktop agent on a windows machine. Such deployment in the centralized server and thin-client desktop-based model may involve the developer publishing the activity to server, then the user connecting the execution machine (with a desktop agent installed) to the centralized server and finally using a web-based user interface to trigger the activity on the required machine. 3. centralized server communicates with the desktop agent to fetch: the logs, the execution status and the business metrics. Logs, execution status, and metrics are processed and accessed via the centralized server.

The complexity of the centralized server and thin-client desktop-based model for Robotic Process Automation (RPA) makes scaling in large-scale environments difficult, if not impossible. This approach is slow, due to the multiple to-and-fro communication (connecting target machine, starting the automation, keep tracking status, logs etc.). This additional complexity of server-based design also reduces the system reliability. Additionally, this system requires more implementation and maintenance cost.

Figure 1:
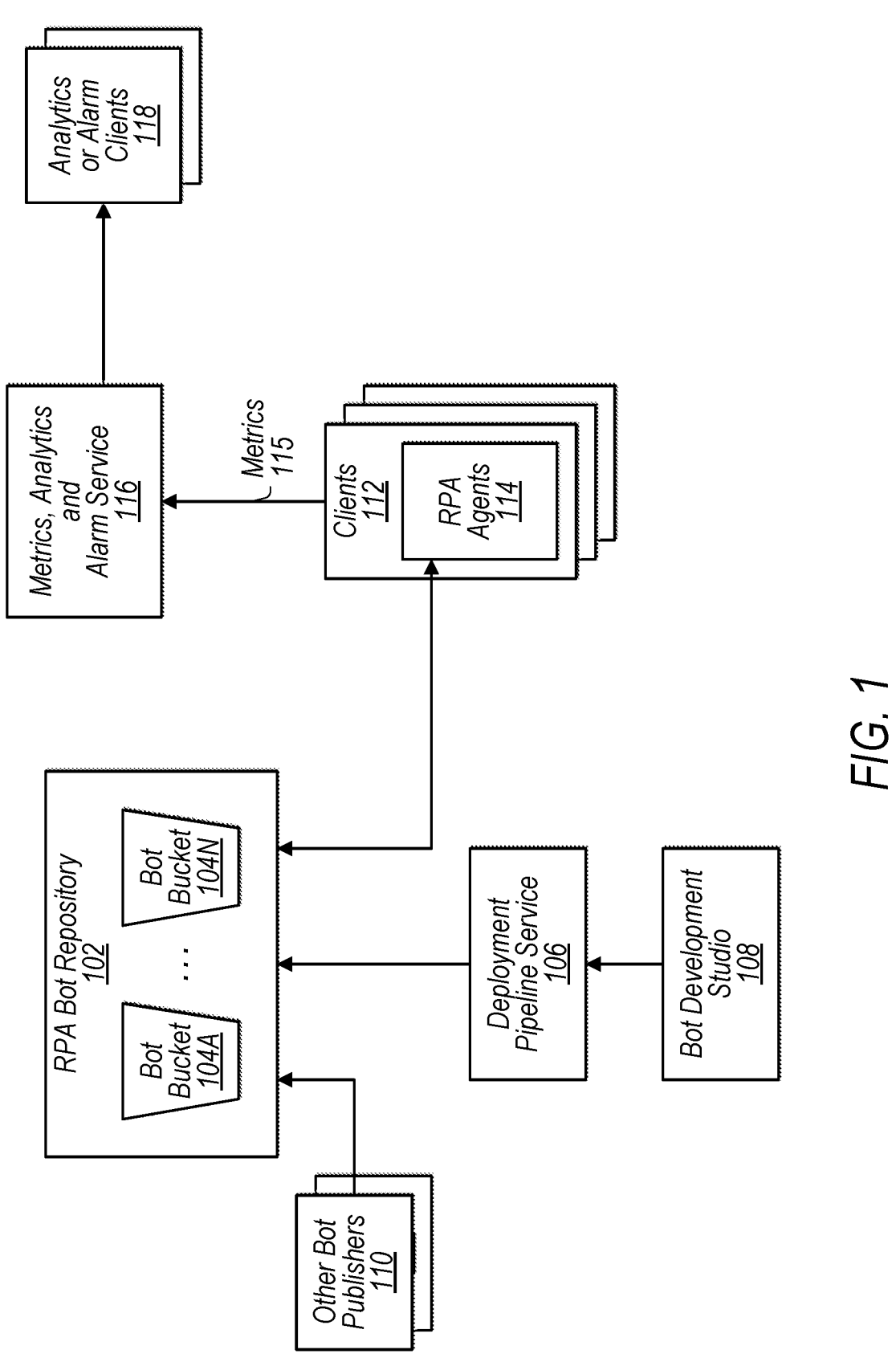
FIG. 1 (correction) is a block diagram that illustrates components of a system that implements a de-centralized distributed RPA bot system, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed below, various embodiments of systems that implement components that perform functionality of a de-centralized distributed RPA bot system are disclosed. In some embodiments, a de-centralized distributed RPA bot system (sometimes referred to as having serverless architecture, herein) provides the benefits of an RPA bot system but without the additional complexity and overhead of conventional systems. Some embodiments, when implemented as described herein, provide a more scalable RPA deployment (e.g., for enterprise-based or network-based service providers).

Embodiments of a de-centralized distributed RPA bot system move some or all of at least the following functionality off of a centralized server-thus implementing a de-centralized distributed RPA bot system. Discovery of new bots (also referred to as automations, herein) as well as updates to the bots, deployment of the bots and publishing of the bots can all be moved off of the centralized server that performs such functionality in a more traditional architecture. The user interface used to select and trigger the bot can be moved off of the centralized server to individual agents that execute on respective client devices (making the triggering and debugging faster and simpler for attended bots.). Offload of the user interface to the agents on the client devices has the benefit of eliminating the complexity of machine discovery, and reduces the complexity of the selection of, and connection with, the bot to be executed. User authentication can also be moved off of the centralized server (e.g., to an LDAP server, an identity and access management (IAM) service hosted by a service provider, etc., or similar). Logging and processing of metrics and generating visualizations of the processed metrics can also be off-loaded (e.g., to open-source applications such as Elasticsearch and Kibana, or otherwise) in embodiments.

In embodiments, the user interface (presented via a centralized web server in some conventional systems) is implemented via a desktop application agent, the user interface for browsing and triggering the automation. In some such embodiments, such an architecture has the added benefit of removing at least some of the communication complexity found in conventional server-based systems. In embodiments, the bots (sometimes referred to as automations, herein) and updates to bots are published via a storage service (e.g., an object store that uses unique key-values to store as many objects, or otherwise) which maintains version-controlled executable code files for the automations, or bots.

To automate deployment of new automations (bots) and/or of updates to bots (new versions), the desktop agents may be configured to poll one time to the storage service to check for new automations and/or latest versions (e.g., when initialized on startup or otherwise triggered). If new automations or new versions are present, the de-centralized distributed RPA bot desktop agents (referred to as simply RPA agents in the FIGs.) that are configured to poll the storage service also automatically update their local storage (e.g., without interaction with a user via an interface, or the like) and use the local storage as a basis for management of the RPA bots (e.g., populating the agent's user interface, launching automations in an execution environment, etc.).

In embodiments, logs, execution status and business metrics are obtained and processed without passing the logs, execution status, or business metrics to a centralized processing server that manages the bots (e.g., data is not sent to an orchestration server, as in conventional systems). For example, metrics may be sent from the agents directly to a metrics, analytics and alarm service, instead, further adding to the de-centralized distributed RPA architecture of the de-centralized distributed RPA bot system.

In some embodiments, RPA bots are desktop applications with a rich user-friendly user interface that provides fine-tuned control to clients for executing and monitoring the automation locally (but more simple agents are also contemplated without departing from the scope of this disclosure). In embodiments, individual RPA bots stored to the local RPA bot data store comprise executable code for interacting with one or more application user interfaces to automate one or more processes. This architecture also facilitates task-centric user interface development and report structures for developers, in embodiments.

In embodiments, robotic process automation enables users to easily configure software robots to automate repetitive, routine work, even between multiple systems, filling in automation gaps to improve performance of tasks. Bots may work directly across application user interfaces, mimicking the actions a user would perform, including logging in and out of applications, copying and pasting data, opening emails and attachments, and filling out forms. In embodiments, bots may have the flexibility to intuitively respond to stimuli and changes in business processes—increasing bot intelligence overtime. Also, in cases where multiple tools are needed to run scripts that perform across multiple applications, RPA can simplify the way users automate tasks by interacting with multiple applications at once, in some embodiments.

In embodiments, attended RPA bots are like virtual assistants, helping an individual employee with their tasks to boost productivity. For example, some attended bots require some human intervention (for example—to trigger the automation and validate the results). In some instances, this is in contrast to unattended RPA bots that run automation that works on its own (unsupervised bots that do not require any, or require very little, human intervention, for example). In embodiments, attended RPA bots assist with tasks by collaborating with employees and teams; employees trigger a bot and interact with it as it helps (unattended RPA bots work independently, following a rules-based process to completion, in embodiments).

With some attended RPA bot embodiments, managers can orchestrate tasks between people and bots and coordinate across internal resources. In embodiments, attended RPA bots are ready and waiting to be activated by employees whenever they are needed to help the process along. This is in contrast with unattended bots that can run either on a preset schedule, or as triggered by logic in the process flow, in embodiments. In some embodiments, hybrid bots combine aspects of attended and unattended bots. For example, in some embodiments, a hybrid Bot model uses RPA techniques for mimicking human actions with one or more exceptions to harness application program interfaces (APIs) wherever applicable. In a hybrid embodiment where minimal human intervention is required, benefits may be experienced from the stability and speed of integrating features from the un-attended bot automation model. In embodiments, the de-centralized distributed (also referred to as serverless) RPA bot system is implemented to support de-centralized deployment of one or more different RPA bot designs (attended, unattended, hybrid, etc.).

In some embodiments, RPA bots come with an inbuilt feature for silent auto-upgrade support (every time a user starts the bot, the bot ensures the latest version, upgrading the bot automatically). In some embodiments, the RPA agent (also referred to as "agent" herein) polls the bot repository on agent startup to ensure the latest version of one or more bots, downloading a more recent version to a local cache, for example.

FIGS. 1-12 illustrate various components of various embodiments of the disclosed de-centralized distributed RPA bot system. As described below, various functionality illustrated in process charts 3, 5, and 6 may be performed by various components illustrated in block diagrams 1, 2, 4, and 7-12. For example, RPA Agents 114 may perform various aspects of the functionality illustrated in FIGS. 5-6, and some combination of Bot Development Studio 108 and Deployment Pipeline Service 106 may perform functionality depicted in FIG. 3.

The FIGs. are presented within the context of RPA bots, but at least some of the functionality described herein may be applicable to other bot types (e.g., Chatbots, RPA bots, virtual assistants, etc.) in some embodiments. The illustrated embodiments are examples and are not an exhaustive arrangement. For example, the order of the functionality illustrated in the process charts may be changed, the functionality performed by various of the components, and the system may be implemented with more or fewer components to perform the functionality.

FIG. 1 is a block diagram that illustrates components of a system that implements a de-centralized distributed RPA bot system, according to some embodiments. In at least the illustrated embodiment, RPA Bot Repository 102 stores bot executables, information about the bot executables, and perhaps an index of the bots in Bot Buckets 104A-104N. The RPA Bot Repository 102 may be implemented by any of various types of data stores, such as but not limited to any of various types of enterprise data stores, or any of various types of network-based data stores such as a data store of a data storage service of a service provider network of a multi-tenant service provider (e.g., a key-value object-based data store of a multi-tenant service provider, file storage, block storage, or similar, etc.).

In the illustrated embodiment, RPA bots (e.g., attended RPA bots or other types of RPA bots such as unattended RPA bots or hybrid RPA bots) are generated by entities such as Bot Development Studio 108 or Other Bot Publishers 110 (e.g., publishers that make RPA bots available for use by other organizations for a fee) and published (sometimes referred to as deployed herein) to the RPA Bot Repository 102 (e.g., via Deployment Pipeline Service 106, or otherwise) wherein the RPA bots are stored in Bot Buckets 104A-N. In some embodiments, the Deployment Pipeline Service 106 is an automated code deployment pipeline (e.g., provided as an internal or external service of a service provider network of a multi-tenant service provider) that automates deployment of RPA bots to the RPA Bot Repository 102. In some embodiments of serverless deployment a Bot Development Studio is implemented to help RPA bot developers deploy their bots to all bot endpoints (on agents 114 of client machines 112). For example, RPA bots may be deployed by the Bot Development Studio 108 to the RPA Bot Repository 102 and the RPA Agents 114 may automatically poll the RPA Bot Repository 102 for the new/updated bots.

In embodiments, RPA bots for a particular organization (sometimes referred to as a particular group, herein) are grouped together in one or more Bot Buckets 104A-N and access to the bots for that organization may be controlled via bucket-based access controls that restrict access on a bucket-by-bucket basis.

RPA Agents 114 are illustrated as executing on respective clients 112. The clients are intended to be construed broadly and may include desktop computing devices, virtual machine clients, portable computing devices or any other computing device, without limitation. In embodiments, RPA Agents 114 provide one or more of i. automated polling of the RPA Bot Repository 102 for new or updated RPA bots, ii. local storage of RPA bots downloaded from the RPA Bot Repository 102, iii. a user interface for managing RPA bots, an execution engine for executing RPA bots, and logging components for generating logs associated with execution of the RPA bots.

RPA Agents 114 are illustrated as producing and transmitting various types of Metrics 115 to Metrics, Analytics and Alarm Service 116. A non-exhaustive list of example metrics includes operational metrics such as quantity of active users per period of time, quantity of active users per bot, quantity of errors, error stack-trace, jobs passed\failed etc. and business metrics (e.g., task-specific customized metrics) such as quantity of work performed by a bot (e.g., records processed by a record processing bot), quantity of effort saved, etc. Metrics reported from agents may be reported in a different format from which the metrics were created, such as in a JSON format, or similar, in embodiments.

Metrics, Analytics and Alarm Service 116 receives the metrics (e.g., operational metrics, or the like), analyzes the metrics, and generates reports and alarms based on the configured thresholds (for example if more than a threshold quantity of error logs within some configurable time period (such as 30 error logs within 1 hour interval)).—The Alarm Service 116 may raise an alarm or log a server trouble ticket to the on-call team to debug and provides metrics, metrics reports, and alarms to Analytics or Alarm Clients 118 (e.g., generating and transmitting a trouble ticket to the operational team in case any of the configured alarm is triggered). In one example, Metrics, Analytics and Alarm Service 116 may be implemented as a custom service or via open-source software such as some combination of a monitoring and observability service, a distributed, search and analytics engine for various types of data, including textual, numerical, geospatial, structured, and unstructured (e.g., Elasticsearch) and/or a distributed search and analytics engine for various types of data, including textual, numerical, geospatial, structured, and unstructured (e.g., Kibana open-source software). In embodiments, implementations that use something like Elasticsearch and a monitoring and observability service can configure alarms and corresponding operational metrics to monitor. Some such software such as Kibana provides an interface for visualizing Elasticsearch data (e.g., the metrics produced by the Agents 114) and navigating the stack of stored metrics. Some such software provides various useful functionality such as tracking query load to understand the way requests flow through various processes, in embodiments.

Analytics or Alarm Clients 118 include, but are not limited to stakeholders, system administrators, bot developers, etc. A non-exhaustive list of example alarms includes an exception alarm (e.g., based on a threshold quantity of exceptions within a threshold amount or period of time) an errors alarm (e.g., based on a threshold quantity of errors in a threshold amount or period of time), a fatal alarm, etc.

Figure 2A:
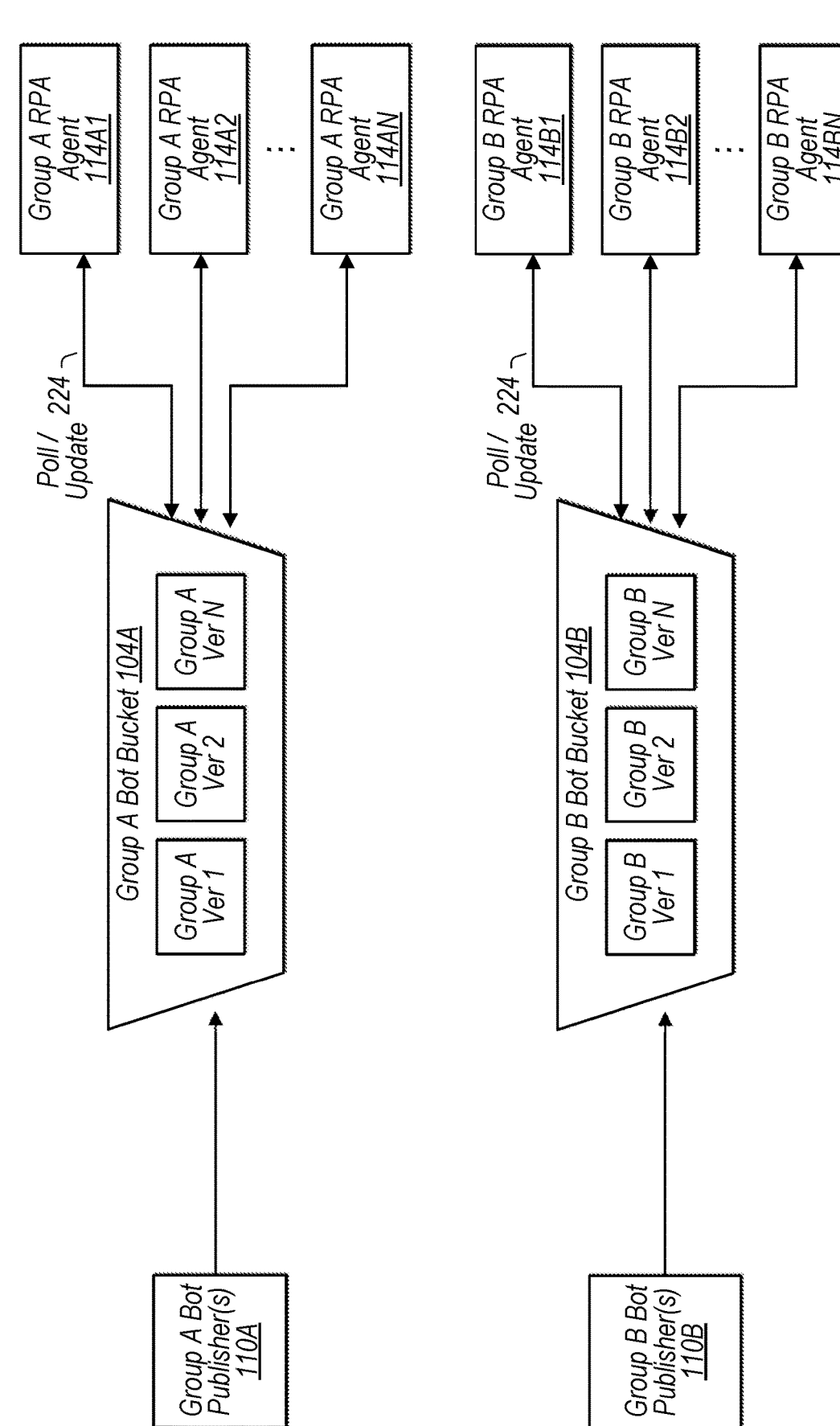
FIGS. 2A/2B are combined block diagram/data flow diagrams illustrating architectures for storage of bots and associated data, and associated data flows in a de-centralized distributed RPA bot system, according to some embodiments.
Figure 2B:
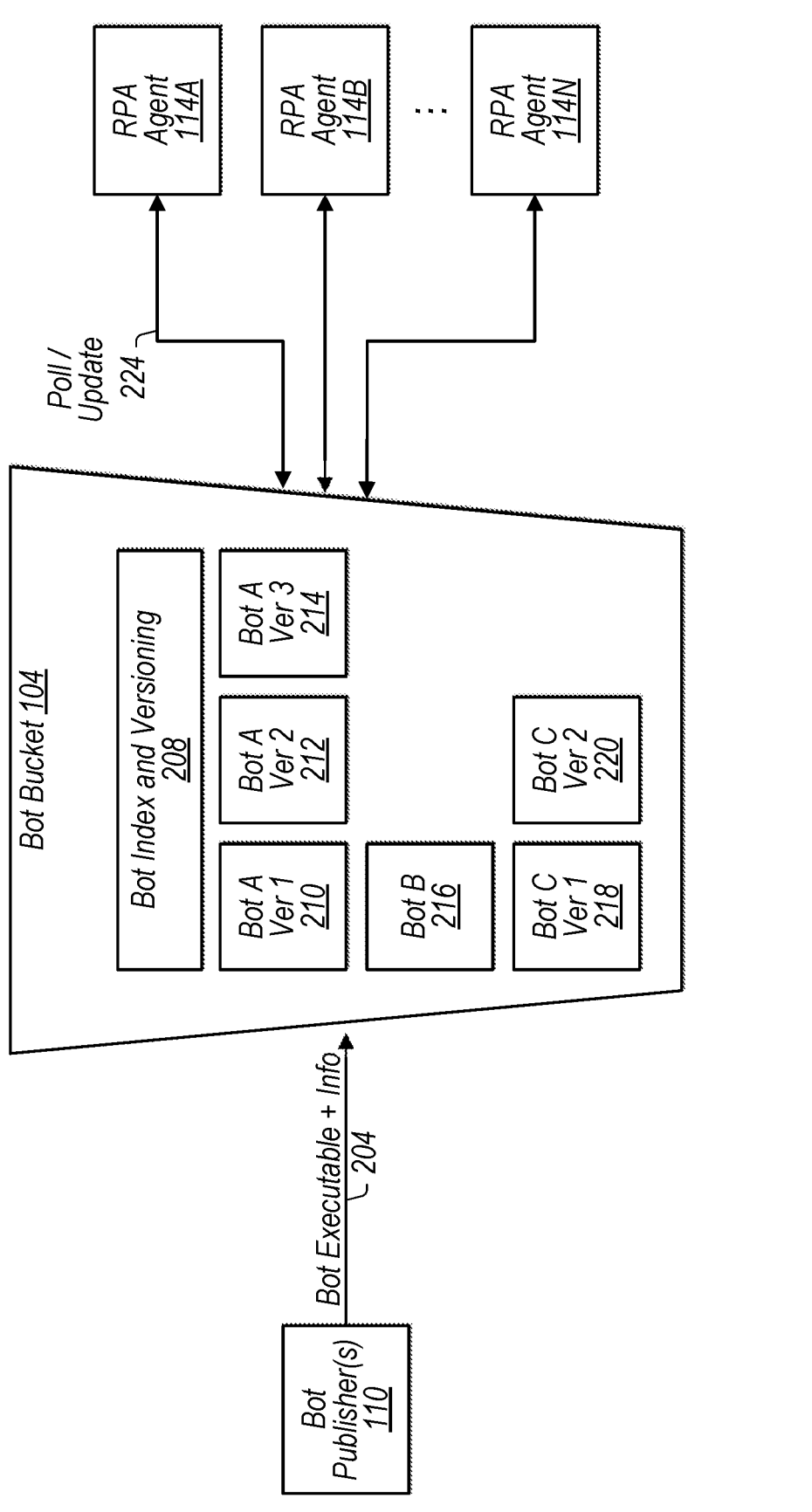

FIGS. 2A/2B are combined block diagram/data flow diagrams illustrating architectures for storage of bots and associated data, and associated data flows in a de-centralized distributed RPA bot system, according to some embodiments. In FIGS. 2A and 2B, bot publishers 110 may accommodate numerous different domain automation needs. A non-exhaustive lists of example domains includes Tax, Accounting, Audit, Compliance, Human Resources, etc. Bot Bucket 104 is illustrated with a Bot Index and Versioning component 208 that stores an index of the bots and bot versions.

FIG. 2A is a combined block diagram/data flow diagram illustrating an architecture for storage of bots and associated bot information, and associated data flows in a de-centralized distributed RPA bot system, according to some embodiments. FIG. 2A illustrates an architecture where different publishers, storage buckets, and agents are associated with a group or organization. In particular, FIG. 2A illustrates Bot Publisher(s) 110A, which may be a service for developers to develop their automations (e.g., also referred to as Bots, herein). Bot Publisher 110 may be a combination of a Bot Development Studio 108 and Deployment Pipeline Service 106. In the illustrated architecture of FIG. 2A, Group A Bot Publisher(s) 110A publish bots to particular bucket for that particular group (Group A Bot Bucket 104A). In some embodiments, a security service (e.g., Authentication and Authorization 1010, described below) may restrict access for the Group A Bot Bucket 104A, to members of Group A for example. FIG. 2A illustrates that versioning may be implemented for the bot executables (sometimes referred to as automations, herein) stored in the bucket 104A. For example, one more bots may be stored in a bucket in a common executable (e.g., a single executable in a bucket may include multiple bots). The executable may be version-controlled when any one of the bots is updated, in embodiments.

In another example, a bucket may store multiple distinct bot executables, each bot executable being version controlled. An index for the bucket may record the versions of the stored bots. FIG. 2A illustrates that Group A RPA Agents 114A1, 114A2, . . . 114AN poll 224 the Bot Bucket 104A for updates. Similarly, Group B Bot Publisher(s) 110 are illustrated as publishing bots and associated bot information (e.g., metadata or the like) to Group B Bot Bucket 104B that stores Group B Bot Version 1, Group B Bot Version 2 and Group B Bot Version N. Group B RPA Agents 114B1, 114B2, . . . 114BN are illustrated as polling 224 bucket 104B for updates to the stored bots.

FIG. 2B is a combined block diagram/data flow diagram illustrating an architecture for storage of bots and associated bot information, and associated data flows in a de-centralized distributed RPA bot system, according to some embodiments. FIG. 2B illustrates Bot Publisher 110, which may be a service for developers to develop their automations (e.g., also referred to as Bots, herein). Bot Publisher 110 may be a combination of a Bot Development Studio 108 and Deployment Pipeline Service 106 (e.g., a service provider code pipeline using code artifact, code commit and code build; after a successful code build the system may automatically deploy the code to storage post), in embodiments. In some embodiments, Bot Publisher 110 is a robotic process automation service hosted on a service provider network of a multi-tenant service provider (for use internally to the service provider, or externally, in various embodiments).

Figure 3:
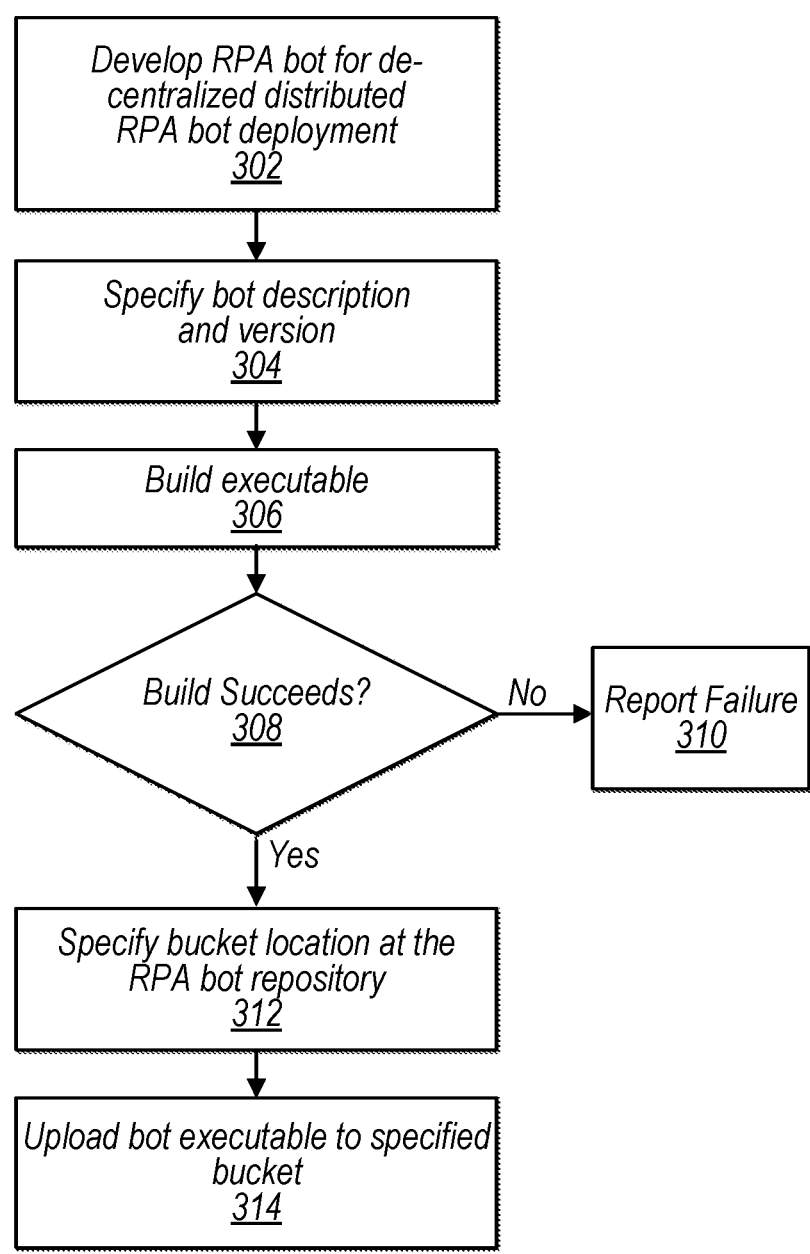
FIG. 3 is a process diagram illustrating a technique for bot publishing in a de-centralized distributed RPA bot system, according to some embodiments.

In FIG. 2B, Bot Bucket 104 is illustrated with Bot A Version 1 210, Bot A Version 2 212, Bot A Version 3 214, Bot B 216, Bot C Version 1 218 and Bot C Version 2 220, which illustrates that a bot bucket may include an index and one or more bots and bot versions. In embodiments, groups of bots and bot versions are grouped together in one or more Bot Buckets 104 and access to the bots and bot version is controlled via an authentication and authorization component that controls access to the buckets (e.g., Authentication and Authorization service 1010 or IAM Service 1120, etc.). In an example, bots for an organization, such as a business, department (IT or tax department) or the like are grouped into buckets that can be accessed by that organization. RPA Agents 114A, 114B . . . 114N are illustrated and poll the Bot Bucket 104 for updates 224 when triggered (e.g., on agent startup or otherwise). RPA Agents 114 A-N may be implemented as an application, process, or other executable that is downloadable to a client device and executable on the client device In embodiments, a Bot Publisher 110, illustrated in FIGS. 2A, 2B, may perform some or all of the functionality illustrated in FIG. 3. FIG. 3 is a process diagram illustrating a technique for bot publishing in a de-centralized distributed RPA bot system, according to some embodiments. In the illustrated embodiment, bot Publisher 110 publishes a bot to Bot Bucket 104, transmitting an executable file (the bot) and additional bot information 204 for the bot, such as metadata, a description of the bot, a version of the bot, a bucket location for the bot, and/or the like.

In embodiments, based on client-specified requirements, it is decided whether a process (e.g., one or more tasks) can be automated or not. If the process can be automated, then the complexity of the process may be analyzed. Client requirements are analyzed and a process definition document is made, and an Object Model Diagram or a Flowchart may be generated to understand the flow or process. An RPA tool to automate the process may be selected. A non-exhaustive list of types of RPA tools includes Excel automation and Macros (simple automation solutions to automate basic processes), Programmable Solution bots (Interact with other systems based on the client's requirements/inputs), Self-Learning Tools (Analyze human actions and perform the same on various platforms), Cognitive automation bots (Self-learning bots which can handle unstructured data, and make decisions based on complex, unstructured input.), etc.

In embodiments, a Development Phase is the phase wherein the Bot Development Studio 108 creates automation scripts in the chosen RPA Tool. The Automation Scripts may be created by referring to the previously created Process Definition Document. Depending on the task to be automated or the kind of automation required, there may or may not be coding required. An advantage of using existing RPA capabilities is that less coding can be sufficient to fulfill the required task.

In embodiments, the bot is tested in the pre-production environment to test how the users can use this bot to automate a specific task or process. After developing and testing a bot, the bot is deployed into the production environment.

In the illustrated embodiment, at block 302, an RPA bot is developed for decentralized distributed bot deployment (e.g., by a Bot Publisher 110). Block 304 illustrates specification of a bot description and version. In embodiments, to publish a change to all deployed instances of a version of a particular bot, incrementing the version number may be specified, via an interface, for example. Block 306 illustrates build of the executable. If the build fails (block 308, no) failure is reported (block 310). If the build succeeds (block 308, yes) a bucket location at the RPA bot repository is specified (block 312). The bot executable is uploaded (with the description, version etc.) to the specified bucket (block 314). In some embodiments, such as those where the bot repository implements an index, the bot index at the RPA bot repository is updated to reflect the new or updated executable and/or version information. The index may be accessed by Agents 114 to determine whether to update the Agent's local cache with a new version(s) of the bot executables from the bot repository. In embodiments, once the build commands, bucket location, etc. are established for a bot while creating the pipeline, they do not need to be specified for follow-on versions of that bot created using the same pipeline.

In embodiments, the bot executables are not executed or otherwise processed by or at the RPA bot repository; the RPA bot repository stores the uploaded bots and an index to the bots and responds to polls for the index or bots from Agents 114. In the illustrated embodiment, a Bot Publisher deploys a number of bot executables (e.g., Bot A Version 1 210, Bot B 216, Bot C Version 2 220, etc.) to Bot Bucket 104, and various RPA agents 114A-N poll the Bot Bucket 104 for the uploaded bots to update locally-stored bots at the RPA Agents 114A-N.

Figure 4:
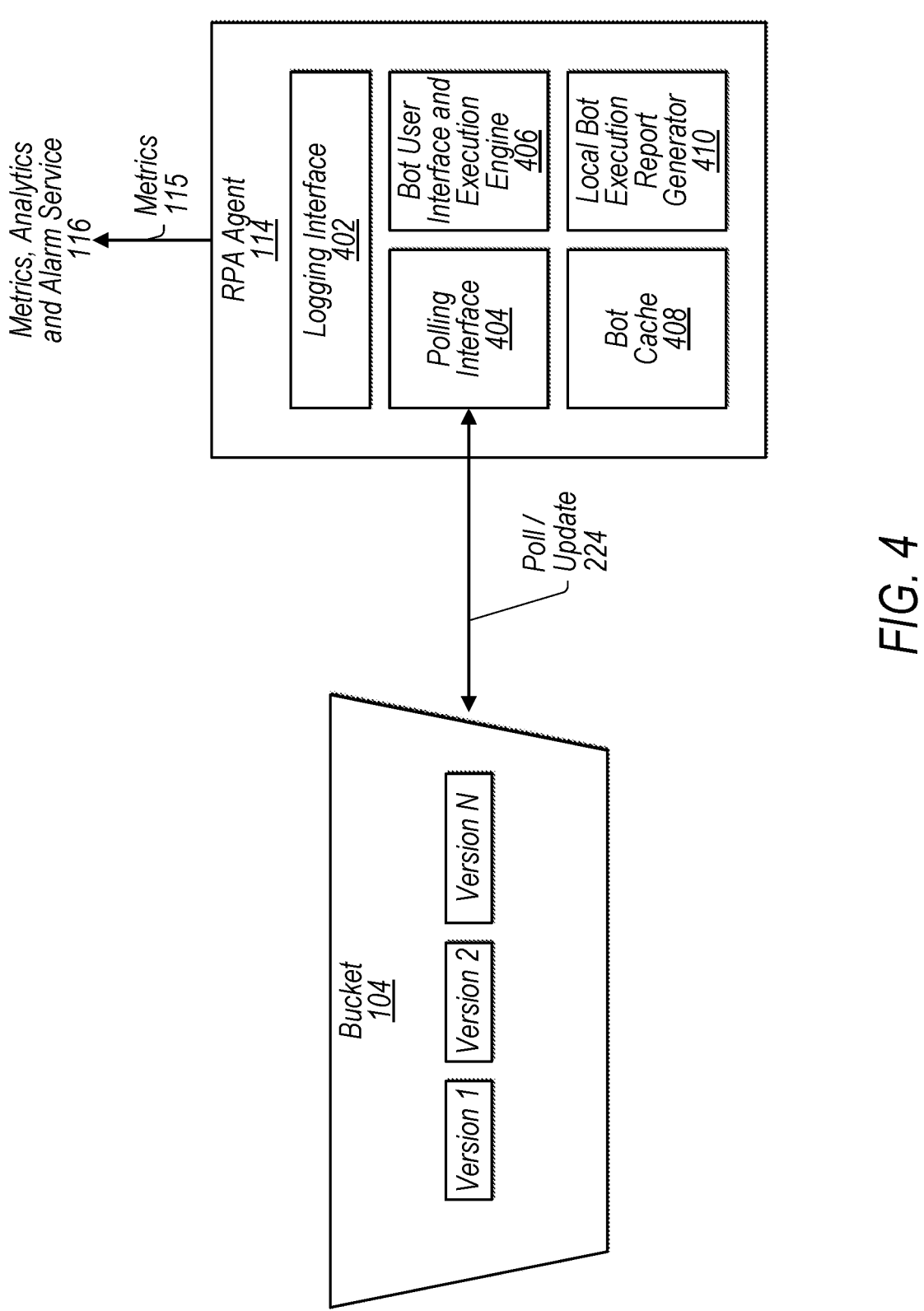
FIG. 4 is a combined block diagram/data flow diagram illustrating components of an RPA agent and associated data flows for a de-centralized distributed RPA bot system, according to some embodiments.

FIG. 4 is a combined block diagram/data flow diagram illustrating components of an RPA Agent 114 and associated data flows for a de-centralized distributed RPA bot system, according to some embodiments. RPA Agent 114 is illustrated with Polling Interface 404 (for polling of polling Bucket 104 for updates 224), Bot Cache 408 (e.g., for storing bot executables downloaded from Bucket 104), Bot User Interface and Execution Engine 406 (e.g., a graphical user interface (GUI), command-line interface (CLI) or other type of interface for selection and/or local management of the bots as well as local execution of the bots), Logging Interface 402 (e.g., for generating and transmitting logs of Metrics 115 to Metrics, Analytics and Alarm Service 116), and Local Bot Execution Report Generator 410 (for local generation of bot execution reports, for example). Some embodiments of a de-centralized distributed RPA bot system implement a Metrics, Analytics and Alarm Service 116 as hosted cloud components like Elasticsearch and Kibana visualization, for processing the logs and producing analytic visualizations, for example. Some embodiments include a light-weight extensible library to accommodate metric display for varied types of tasks. In various embodiments, Bot Bucket 104 may be configured similar to buckets 104A/B in FIG. 2A, or similar to Bot Bucket 104 in FIG. 2B.

Figure 5:
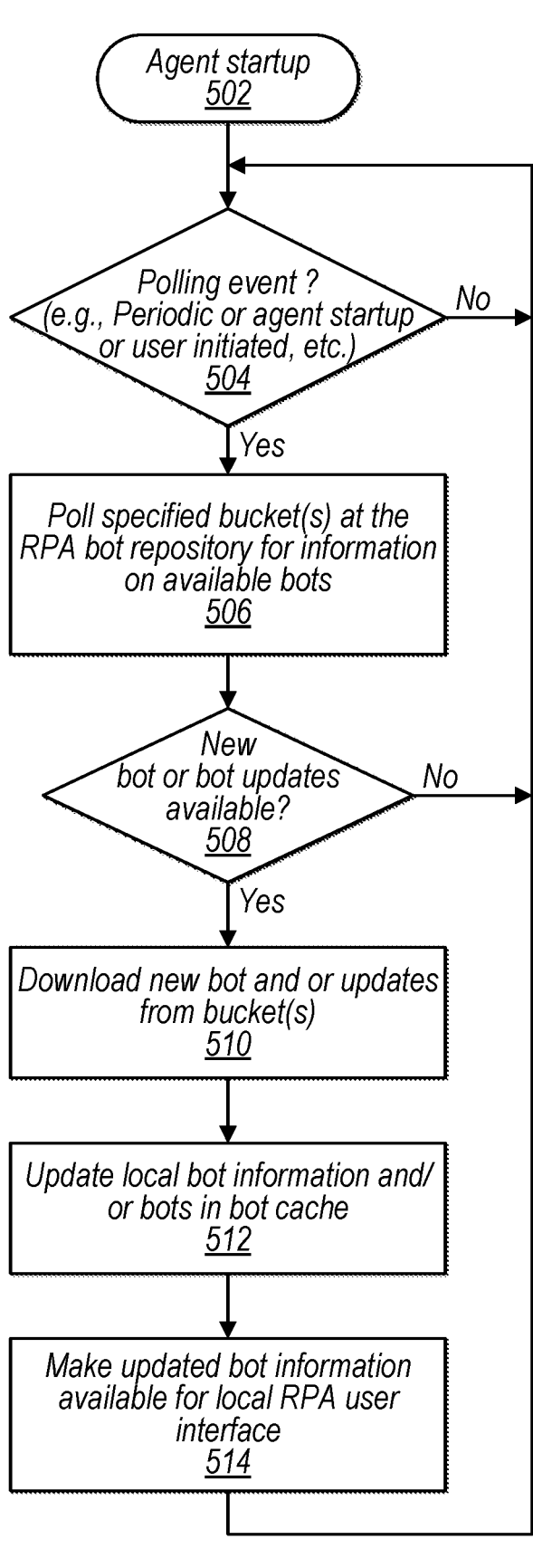
FIG. 5 is a process diagram that illustrates a technique for polling, by RPA agents, for bot updates to local storage of the RPA agent in a de-centralized distributed RPA bot system, according to some embodiments.

FIG. 5 is a process diagram that illustrates a technique for polling, by RPA agents 114, for bot updates to local storage 408 of the RPA agent in a de-centralized distributed RPA bot system, according to some embodiments. Some or all of the functionality depicted in FIG. 5 may be performed by one or more of the components of the Agent 114 illustrated in FIG. 4. In embodiments, the process depicted in FIG. 5 may be performed automatically, such that the process is hidden from or not readily made apparent to a user interacting with the Agent 114. The polling happens every time the agent is started (e.g., after closing), in embodiments. Agents which are already active or executing some work do not get affected by the update, in embodiments.

Agent startup (block 502) begins the illustrated embodiment of the process, such as launch of the Agent Application 114 on a Client Device 112, for example. Block 504 illustrates a polling event, such as a periodic polling event (e.g., a configurable time period or similar), or startup of the Agent 114, or a user-initiated polling event (e.g., via a user selectable command of an interface of Agent 114), that may be performed via the Polling Interface 404, in embodiments. If no polling event is determined (block 504, no) the Agent 114 continues to wait until a polling event is determined or triggered. For a determined polling event (block 504, yes) the Agent 114 polls specified bucket(s) at the RPA Bot Repository 102 for information on available bots (block 506). For example, Agent 114 may poll an index at the RPA Bot Repository 102 for information on available bots. The index may be stored in a bucket together with bots that are indexed by the index, or separate from the bots indexed by the index, in various embodiments. In some embodiments, the index may be stored in a data store separate from the RPA Bot Repository 102. The polling may return a response usable to determine whether new bot or bot updates are available from the RPA Bot Repository 102. If it is determined there are no new updates (block 508, no) the process returns to waiting for a polling event (block 504). If it is determined there are new updates (block 508, yes) the process downloads new and/or updates bots from bucket(s) at the RPA Bot Repository 102 (block 510). In embodiments, the process may also download additional information with the new and/or updated bots, such as the bot description, etc. The downloaded new and/or updated bots and/or the associated information is used to update the local bot information and/or bots in a Bot Cache 408 that is local to the Agent 114 (block 512). In the illustrated embodiment, the updated bot and bot information is made available for a local RPA user interface 506 (block 514).

Figure 6:
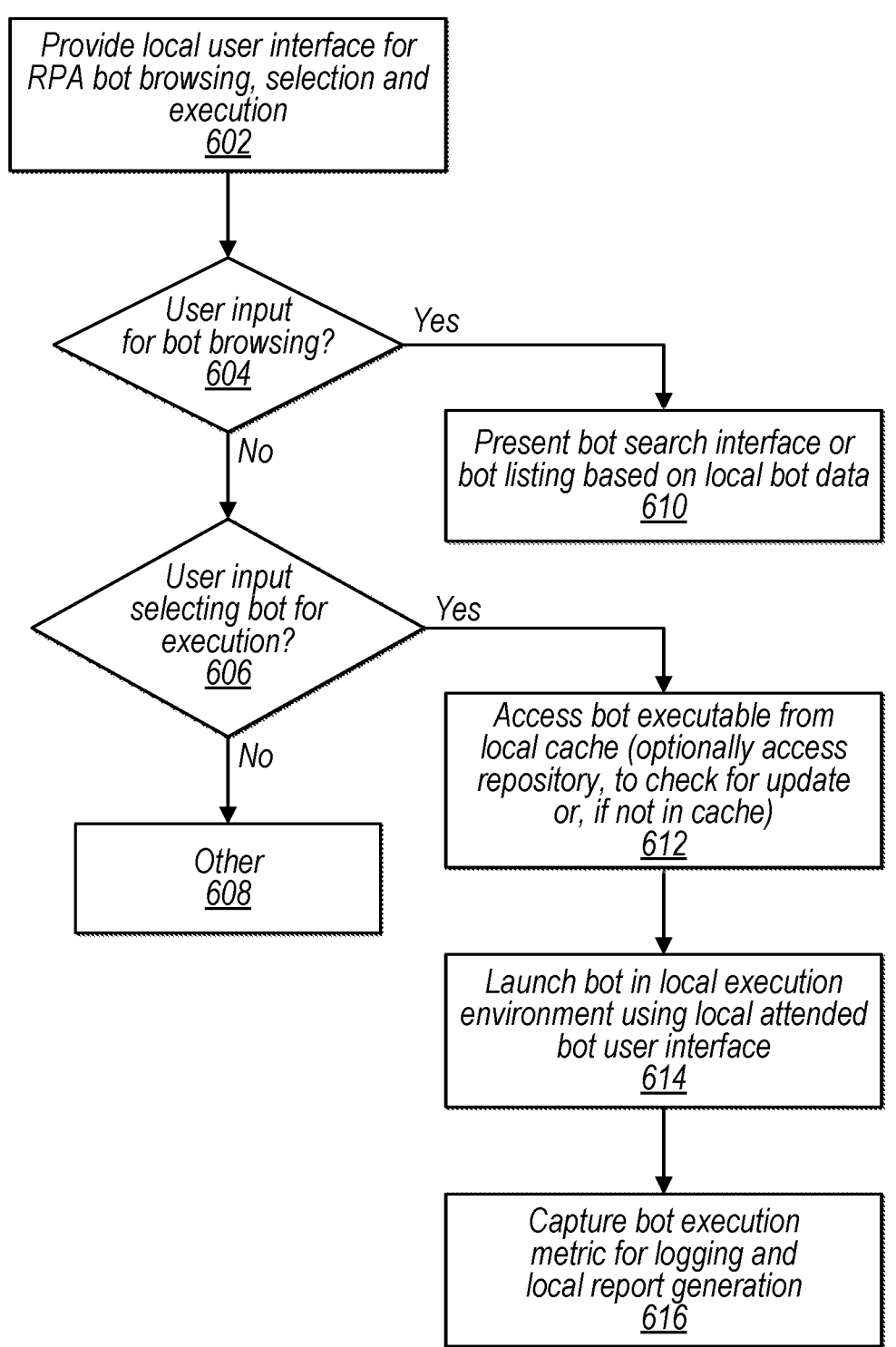
FIG. 6 is a process diagram that illustrates a technique for an RPA agent to provide for local management of RPA bots in a de-centralized distributed RPA bot system, according to some embodiments.

FIG. 6 is a process diagram that illustrates a technique for an RPA agent to provide for local management of RPA bots in a de-centralized distributed RPA bot system, according to some embodiments. The process illustrated in FIG. 6 may be performed by one or more components of an Agent 114, for example.

At block 602, the Agent 114 provides a local user interface for RPA bot browsing, selection and execution. For example, a Bot User Interface 406 stored as program instructions in storage on the client device for Agent 114 may be executed by the Agent 114 and may be configured to display interface elements for RPA bot browsing, selection and/or execution.

In response to receipt of user input (e.g., via Bot User Interface 406 of Agent 114) for bot browsing (block 604, yes), a bot search interface or bot listing based on local data is presented (block 610). Various interface elements and/or Bot information displayed via the Bot User Interface 406 may be populated from the Bot Cache 408, local to the Agent 114. In some embodiments, some portion of the data displayed via the Bot User Interface 406 may be populated from a combination of data from the Bot Cache 408, local to the Agent 114, as well as from the RPA Bot Repository (e.g., Bots or Bot versions available for download to the Agent that have not been downloaded to the local cache yet). In some embodiments, the bots and bot information used to populate portions of the Bot User Interface 406 (e.g., the search interface or a management interface, of the like, of Bot User Interface 406) may be populated exclusively from data stored in Bot Cache 408 or populated exclusively from data otherwise on Agent 114.

If user input for bot browsing is not received (block 604, no) and user input selecting (e.g., via Bot User Interface 406) a bot for execution is received (block 606, yes) the Agent 114 accesses (block 612) the selected bot executable from the local cache 408. Optionally, the Agent 114 may access the RPA Bot Repository 102, to check for updates, or if the selected bot is not in the cache. If user input for selecting a bot is not received (block 606, no) other functionality may be performed, such as local generation of a report based on the metrics, based on receipt of user input selecting report generation, for example. The bot is launched in the local execution environment of the Agent 114 using the local attended bot user interface (block 614). Bot execution metrics are captured for logging and/or for local report generation (block 616). For example, Agent 114 may capture metrics associated with the local execution of the bot and send the metrics as logs to a Metrics, Analytics, and Alarm Service 116, and/or generate local reports based on the metrics (e.g., Local Bot Execution Report Generator 410 may generate the reports). In some embodiments, the Local Bot Execution Report Generator 410 or the Bot User Interface and Execution Engine 406 may display the reports or transmit the reports.

In embodiments, bots (e.g., the executables stored to the bot repository and downloaded and executed on the agents 114) are created with an internal audit system. For example, the internal audit system (e.g., part of the Local Bot Execution Report Generator 410, in embodiments) may be configured to produce developer logs (e.g., generated on Elasticsearch and Kibana for developers to monitor production bot health) and/or an audit report (e.g., a task-oriented customized audit report which contains an audit trail for actions executed by the bot, and may be generated for later verification by the process owner for compliance).

Figure 7:
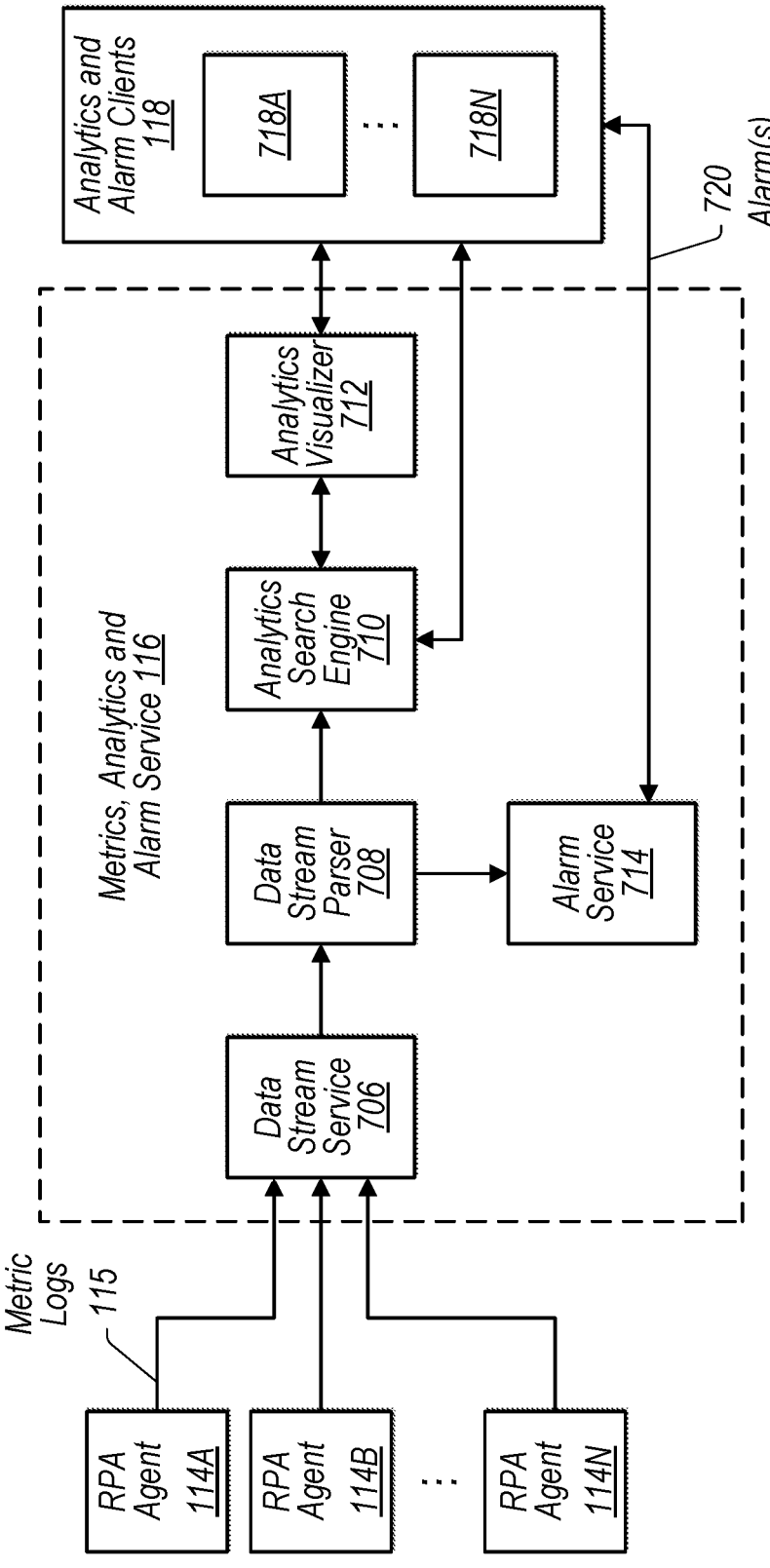
FIG. 7 is a combined block diagram/data flow diagram illustrating an architecture for components of an analytics and alarm service for use with a de-centralized distributed RPA bot system, according to some embodiments.

FIG. 7 is a combined block diagram/data flow diagram illustrating an architecture for components of a Metrics, Analytics and Alarm Service 116 for use with a de-centralized distributed RPA bot system, according to some embodiments. Architectural components may comprise a JSON structure, code executing in a serverless compute service, and metric library code, in an example embodiment. Generally, metrics are generated by RPA Agents 114A-N (or by the RPA bots, in some embodiments) as RPA bots are executed by the Agents. In the illustrated embodiment, logs 115 of the metrics are transmitted to an endpoint of (sometimes referred to as ingested by) a data stream service 706 of the Metrics, Analytics and Alarm Service 116. As illustrated, a Data Stream Parser 708 parses the metrics into consumable data or information that is used by an Analytics Search Engine 710 and/or Alarm Service 714. Analytics Visualizer 712 is illustrated and may include various visualization functionality that is applied, by the Analytics Visualizer 712 to the produce visualizations based on the metrics, for display to requesting clients 118. In embodiments, Analytics and Alarm Clients 118 includes individual Analytics and Alarm Clients 718A-718N that execute on various different client devices. A non-exhaustive list of example Analytics and Alarm Clients 716A-716N may include client devices used by stakeholders, system administrators, bot developers, etc. to access the Analytics Search Engine 710 directly, to obtain visualizations generated by the Analytics Visualizer 712, or to receive alarms 720 from Alarm Service 714.

Figures 8A, 8B:
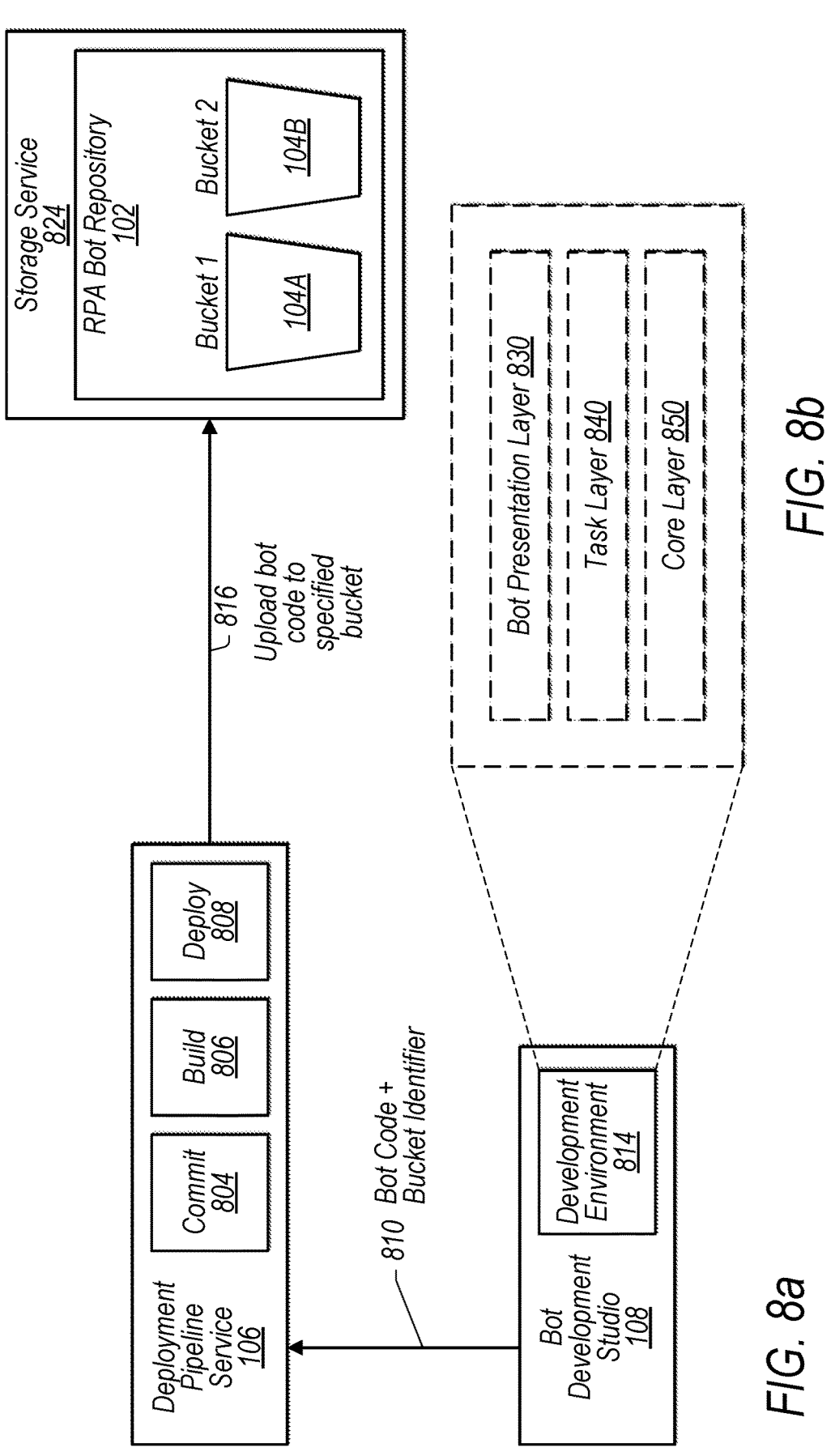
FIGS. 8a and 8b are combined block diagram/data flow diagrams illustrating an architecture for a bot deployment pipeline in a de-centralized distributed RPA bot system, according to some embodiments.

FIGS. 8a and 8b are combined block diagram/data flow diagrams illustrating an architecture for a bot deployment pipeline in a de-centralized distributed RPA bot system, according to some embodiments. FIGS. 8a and 8b illustrate that a Bot Development Studio 108 includes a Development Environment 814 with a three-layer architecture (Bot Presentation Layer 830, Task Layer 840, and Core Layer 850) illustrated in more detail in FIG. 9, described below).

In the illustrated embodiment, subsequent to development of a bot (e.g., an RPA bot or other type of bot) the Bot Code and Bucket Identifier (together, 810) are provided to a Deployment Pipeline Service 106. The Deployment Pipeline Service 106 processes the Bot Code and Bucket Identifier 810 through Commit 804, Build 806 and Deploy 808. In embodiments, Commit 804 is implemented as a managed source control service that hosts secure Git-based repositories such as the RPA Bot Repository 102. In embodiments, Commit 804 automates creation and/or management of a storage location (e.g., creation or management of storage for the bot to the RPA Bot Repository 102) to store the Bot Code. In embodiments, Build 806 is a continuous integration service that compiles source code, runs tests, and produces software packages that are ready to deploy, to the RPA Bot Repository 102 for download to the Agents 114. In embodiments, Deploy 808 (sometimes referred to as a publishing manager, herein) is a managed deployment service that automates software deployments to storage such as an RPA Bot Repository 102, hosted by a service provider network, or hosted by on-premises storage, as non-exhaustive examples. In some embodiments, a Deployment Pipeline Service 106 (sometimes referred to as a publishing manager herein, a managed continuous delivery service that automates release pipelines for fast and reliable application and infrastructure updates, in embodiments) creates an end-to-end pipeline that fetches the bot code from Commit 804, builds and tests using Build 806, and deploys (e.g., Upload bot code to specified bucket, as at 816) using Deploy 808. In embodiments, a publishing manager is a downloadable executable that may be downloaded from a service such as serverless RPA Bot Registration Service 1124 (illustrated in FIG. 11) and run locally to facilitate bot publishing in manners similar to those discussed above.

In the illustrated embodiment, if Bot Bucket 1 104A is specified as the Bucket Identifier by the Bot Development Studio 108 at upload 810 (and if the upload is authorized), the corresponding Bot Code is uploaded, by the Deployment Pipeline Service 106 to Bot Bucket 1 104A of the RPA Bot Repository 102. A similar upload may be performed to Bucket 2 104B when Bucket 2 104B is specified. Access controls (e.g., implemented by an authentication and authorization service, or the like) may ensure authorized access to buckets. In some embodiments, one pipeline publishes to one bucket only.

In some embodiments, a Bot Development Studio 108 for generating bots for the disclosed de-centralized distributed RPA Bot system (e.g., illustrated in FIG. 1) may generate bots in accordance with a Model View View-model (MVVM) architecture—a software architectural pattern that facilitates the separation of the development of the graphical user interface (the view)—be it via a markup language or GUI code—from the development of the business logic or back-end logic (the model) so that the view is not dependent on any specific model platform, for example.

Figure 9:
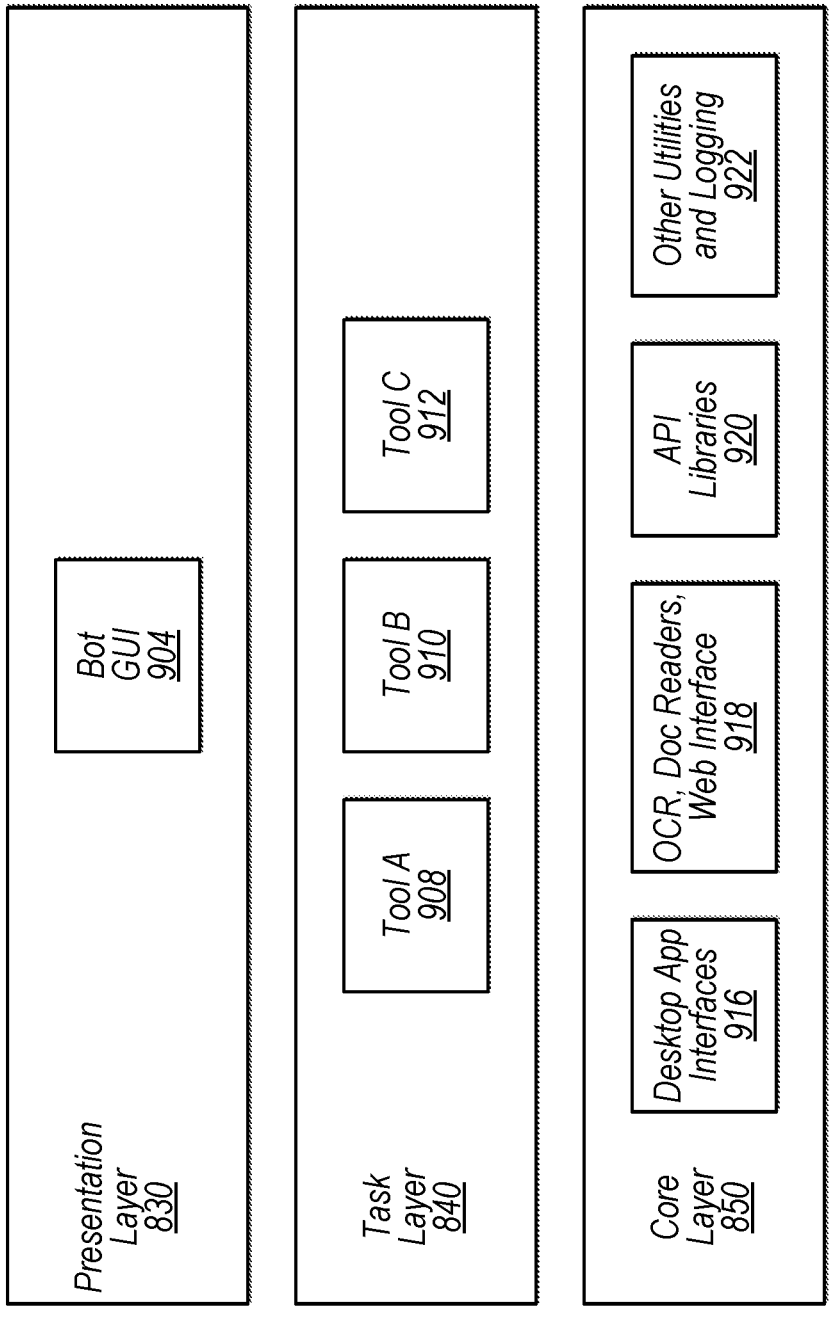
FIG. 9 is a block diagram that illustrates an overall framework of a core layer, task layer, and presentation layer, for a de-centralized distributed RPA bot system, according to some embodiments.

FIG. 9 is a block diagram that illustrates an overall framework of a Core Layer 850, Task Layer 840, and Presentation Layer 830, for developing bots for a de-centralized distributed RPA bot system, according to some embodiments. In embodiments, functionality provided by components from the Core Layer 850, and/or the components are used in implementation of various tools (e.g., Tool A 908, Tool B 910, Tool C 912) of the Task Layer 840. Core Layer 850 is illustrated with a non-exhaustive, example set of components. For example, Desktop Application Interfaces 916, Optical Character Recognition (OCR), Document Readers, Web Interface 918, API Libraries 920, and Other Utilities and Logging 922 are illustrated as part of the Core Layer 850. Such an architecture may have the benefit of improving scalability of the de-centralized distributed RPA bot system, in embodiments.

In embodiments, the tools of the Task Layer 840 are accessed via a Presentation Layer 830 (e.g., via a Bot interface, such as a Bot graphical user interface (GUI) 904). Bot GUI 904 is distinct from Bot User Interface and Execution Engine 406, in embodiments. For example, Bot GUI 904 may be implemented via the executable code of the respective bot, while Bot User Interface and Execution Engine 406 may be implemented by an RPA agent. In embodiments, the interface of the Bot User Interface and Execution Engine 406 provides a search interface with descriptions of various different bots stored in cache 408, while Bot GUI 904 is the interface for a respective bot.

A Bot executable that is stored in the RPA Bot Repository 102 and/or executed in a local environment of an RPA agent 114 may include code for providing a bot GUI to access one or more of the Tools A-C (908-912) that are built upon the components of the Core Layer 850. As attended bots may reside on a desktop with existing desktop resources, they may reuse the existing desktop resources (such as Desktop Application Interfaces 916, Optical Character Recognition (OCR), Document Reader, etc.).

Reusable Bot Framework

In at least some embodiments, various functionality to be implemented across numerous bots (reusable code) may be provided as an existing framework (e.g., as reusable code artifacts or the like). For example, bot developers 108 and/or publishers 110 may develop code for one or more of the layers (e.g., Bot Presentation Layer 830, Task Layer 840, Core Layer 850) and the code may be published to a code repository, such as Code Artifact Repository Service 1126 (illustrated in FIG. 11, described below). Permissions for reuse of the code may be set via an authentication and authorization service 1010, such as IAM Service 1120 (illustrated in FIG. 11, described below). Other publishers/developers, with permissions, may be permitted to use the code created by other publishers/developers as building blocks to create complete bots that are added to the RPA bot Repository 102. Provided below is an example of reusable code within the context of a bot retry framework that deals with throttling by web services with which the bots interact.

In at least some embodiments, web services that bots interact with may exhibit throttling to maintain performance and reliability, for example, by limiting the number of user actions or concurrent calls (by script or code) to prevent overuse of web service resources. In some embodiments, bots may respond to throttling by a web service with any of one or more of the following list of non-exhaustive examples: reducing the number of operations per request, reducing the frequency of calls, decorating the traffic to indicate ownership (so the system can recognize the traffic and respond in some planned manner), leverage the Retry-After HTTP header, etc. In embodiments, bots may respond to throttling by implementing any of various techniques that may be provided in a library, such as exponential back off with jitter (e.g., instead of retrying after waiting for a fixed amount of time, increase the waiting time between retries after each retry failure) or similar.

An example implementation of many possible implementations of back off is 1. identify if the fault is a transient fault, 2. define the maximum retry count, 3. retry the service call and increment the retry count, 4. if the call succeeds, return the result to the caller, 5. if the same fault continues, increase the delay period for next retry, 6. keep retrying and keep increasing the delay period until the maximum retry count is hit, 7. if the call is failing even after maximum retries, let the caller module know that the target service is unavailable. In at least some of the above embodiments of back off, the client delays are progressively longer but still synchronized. In embodiments, adding jitter provides a way to break the synchronization across the clients thereby avoiding collisions. In some embodiments of back off with jitter, randomness is added to the wait intervals.

In embodiments, a circuit breaker pattern handles the long-lasting transient faults. Implementation involves wrapping the service calls by the bots in code described as circuit breaker code. For example, if the number of retry failures reaches above a certain threshold value, the circuit is made OPEN, which means the service is not available at the time. Once the circuit reaches the OPEN state, further calls by the bot to the service will immediately return failure to the bot instead of executing the retry logic.

In embodiments, a circuit breaker implements some timeout period after which it will move to HALF-OPEN state. In this state, it will allow a service call which will determine if the service has become available or not. If the service is not available it goes back to OPEN state. If the service becomes available after this timeout, the circuit breaker moves to CLOSED state. The callers will be able to call the service and the usual retry mechanism will come into play again. Some such embodiments help to circumvent useless retry execution in case the fault is long lasting and thus saves resources and provides more immediate feedback to the callers. In embodiments, use of the above-described exponential back off and/or circuit breaker may be a configurable feature that can be turned on or off, by an administrator, customer of a service provider, or other.

Security

Figure 10:
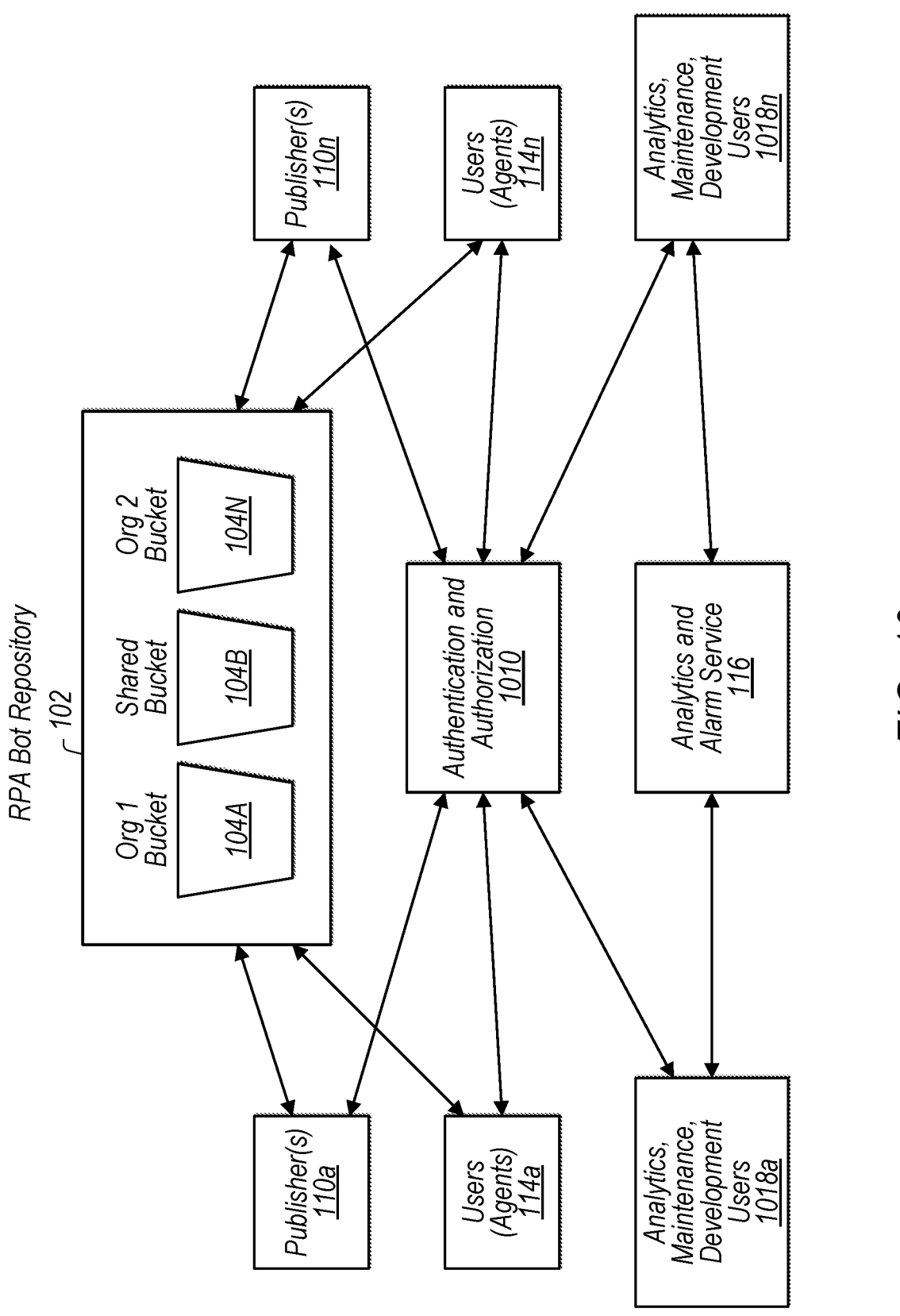
FIG. 10 is a block diagram that illustrates relationships between security features and other components of a de-centralized distributed RPA bot system, according to some embodiments.

FIG. 10 is a block diagram that illustrates relationships between security features and other components of a decentralized distributed RPA bot system, according to some embodiments. In embodiments, buckets are used as containers for storing bots and bot-related information within the RPA Bot Repository 102. In embodiments, one or more of the buckets 104A-N are owned or controlled or allocated to organizations (e.g., a company, an IT department, a sales department, a tax department or other type of organization, without limit) and access to objects in the buckets limited to the organizations that own or control the buckets. In some embodiments, individual business units or organizations are associated with individual buckets (e.g., accounts of members of a business unit are limited to using bots from that business unit's bucket. Further granular access may be controlled in accordance with security policies enforced by the Authentication and Authorization service or component 1010, in embodiments.

FIG. 10 illustrates RPA Bot Repository 102 with Organization 1 Bucket 104A, Shared Bucket 104B and Organization 2 Bucket 104N. On the left side of FIG. 10 Publisher(s) 110a, Users (Agent) 114a and Analytics, Maintenance, Development Users 1018a are illustrated and may constitute an ecosystem of related entities associated with bots in Org 1 Bucket 104A. Similarly, on the right side of FIG. 10 Publisher(s) 110n, Users (Agent) 114n and Analytics, Maintenance, Development Users 1018n are illustrated and may constitute an ecosystem (e.g., an organization or other related group of entities) associated with bots in Org 2 Bucket 104N. Owners of buckets may specify policies that control access to the buckets, in embodiments, restricting access to the buckets to member entities of the ecosystem or organization.

Generally, Authentication and Authorization component (or service) 1010 may provide for authentication of the entities in FIG. 10 and/or for authorization of operations requested by the entities in FIG. 10. For example, policies of the Authentication and Authorization component (or service) 1010 may specify that only the Publisher(s) 110a, Users (Agent) 114a and Analytics, Maintenance, Development Users 1018a may access the Org 1 Bucket 104A. In contrast, Publisher(s) 110n, Users (Agent) 114n and Analytics, Maintenance, Development Users 1018n, not specified in a policy as having access to the Org 1 Bucket 104A, would not be granted access to the Org 1 Bucket 104A. In the illustrated example, one or more policies of the Authentication and Authorization component (or service) 1010 may specify that only the Publisher(s) 110n, Users (Agent) 114n and Analytics, Maintenance, Development Users 1018n are to be provided with access to Org 2 Bucket 104N. Publisher(s) 110a, Users (Agent) 114a and Analytics, Maintenance, Development Users 1018a, not specified in a policy as having access to the Org 2 Bucket 104N, would not be granted access to the Org 2 Bucket 104N.

In at least the illustrated embodiment, Shared Bucket 104B is shared between different organizations such as the organization on the left (110a, 114a, 1018a) and the organization on the right (110n, 114n, 1018n). For example, based on a policy of the Authentication and Authorization component 1010 that specifies that access to Shared Bucket 104B is authorized for entities the organization on the left (110a, 114a, 1018a) and for entities of the organization on the right (110n, 114n, 1018n) the RPA bot Repository may provide shared access to Shared Bucket 104B to both entities (110a, 114a, 1018a) of the organization depicted on the left as well as to entities (110n, 114n, 1018n) of the organization depicted on the right. Access authorization for a given bucket may be altered by making changes to the policies of the Authentication and Authorization component 1010, in embodiments.

In some embodiments, Authentication and Authorization component 1010 may be implemented, at least part, as a Lightweight Directory Access Protocol (LDAP)-based authentication server and/or an enterprise or service provider-based Identity and Access Management service.

In embodiments, Publishers 110*a-n*, Users (Agents) 114*a-n*, and Analytics, Maintenance, and Development Users 1018*a-n* may be required to authenticate to Authentication and Authorization component 1010 and/or obtain authorization from Authentication and Authorization component 1010 for requests made to RPA Bot Repository 102 and/or Analytics and Alarm Service 116. For example, Analytics and Alarm Service 116 may only provide access to authenticated and/or authorized analytics users 1018 that have been authorized by Authentication and Authorization component 1010 prior to being provided access to analytics reports. In another example, RPA Bot Repository may restrict access to only authorized Agents 114 (or bots) or other entities that have been authorized by a policy of the Authentication and Authorization component 1010.

In embodiments, such as those outside of a service provider network or those that do not use the service provider-hosted authentication and authorization service, the system may implement an authentication and authorization service such that bucket owners can specify access to buckets (e.g., the entities allowed, and the type of access). A similar system may be implemented to control access to the analytics data, in embodiments.

Figure 11:
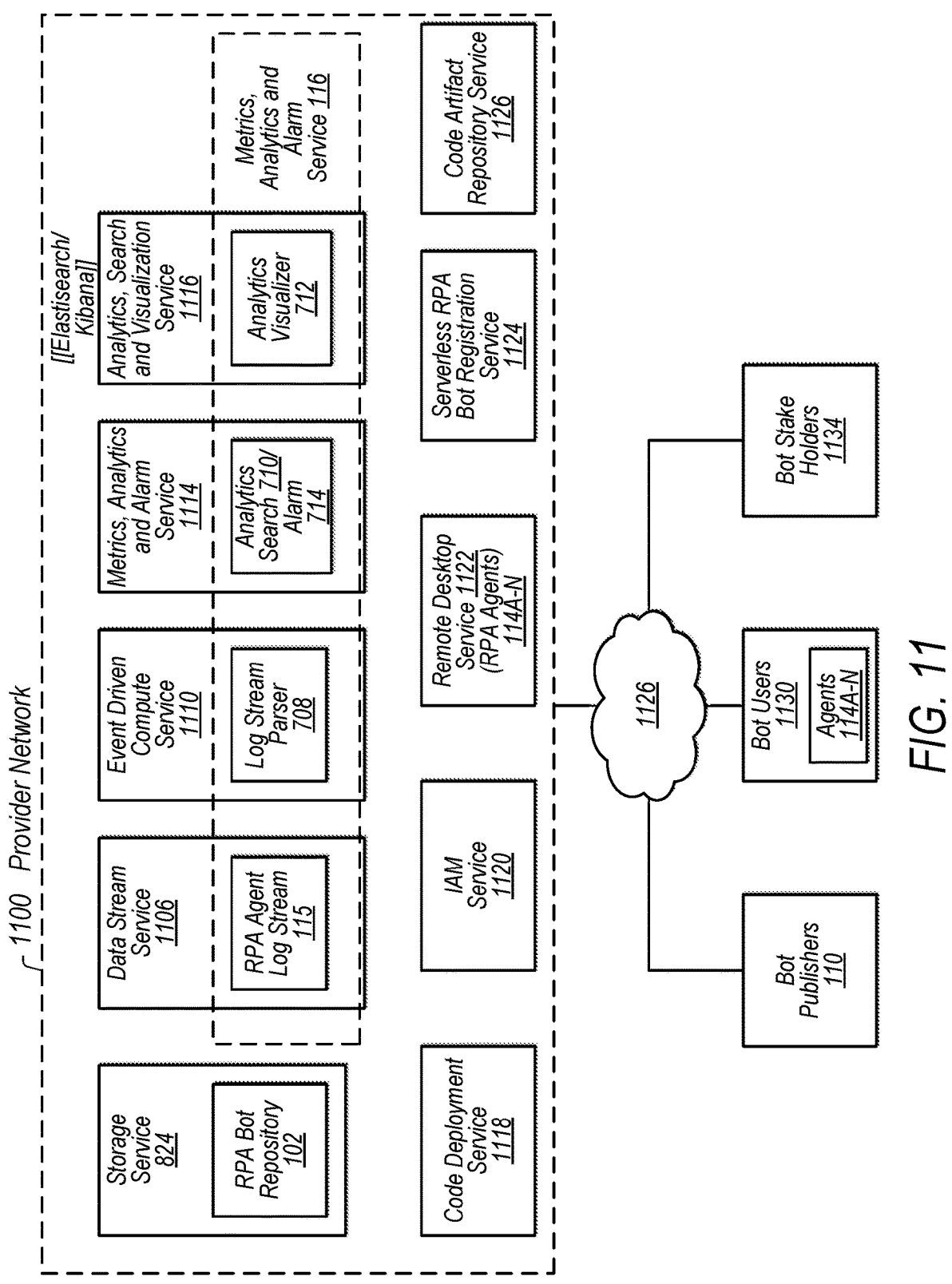
FIG. 11 is a block diagram that illustrates a service provider-based architecture for a de-centralized distributed RPA bot system, according to some embodiments.

It is contemplated that a de-centralized distributed RPA bot system may be implemented as an enterprise-based process, or as a cloud-based service. FIG. 11 is a block diagram that illustrates a service provider-based architecture for a de-centralized distributed RPA bot system, according to some embodiments. Service Provider Network 1100 (e.g., of a multi-tenant service provider that provides network-based services to a number of distinct clients of the multi-tenant service provider) is illustrated with numerous services. Service Provider Network 1100 is illustrated as hosting a Storage Service 824 (e.g., any of various types of storage service, such as but not limited to a key-value object-based data store), Data Stream Service 1106 (e.g., a scalable and durable data streaming service configured to capture large amounts of data per second from hundreds of thousands of sources), Event-Driven Compute Service 1110 (e.g., a serverless compute service that runs code without provisioning or managing servers, without creating workload-aware cluster scaling logic, without maintaining event integrations, and/or without managing runtimes). Service Provider Network 1100 is illustrated as hosting a Metrics, Analytics and Alarm Service 1114 (e.g., a monitoring and observability service built for DevOps engineers, developers, site reliability engineers (SREs), IT managers and the like, etc.) and an Analytics, Search, and Visualization Service 1116 (e.g., some combination of Elasticsearch—an open source, distributed, RESTful, JSON-based search engine and/or Kibana-a free, open-source visualization tool). Service Provider Network 1100 is illustrated as hosting a Code Deployment Service 1118 (e.g., a managed continuous delivery service that automates release pipelines for fast and reliable application and infrastructure updates), and an Identity and Access Management (IAM) Service 1120 (e.g., a network-based service that securely controls authentication and authorization for accessing resources). Service Provider Network 1100 is illustrated as hosting a Remote Desktop Service 1122, and a Serverless RPA Bot Registration Service 1124. Bot Publishers 110, Bot users 1130 and Bot Stake Holders 1134 are also illustrated.

In the illustrated embodiments, Agents 114A-N may execute within Provider Network 1100 or external to the Provider Network 1100, the RPA Bot Repository 102 may be implemented via a Storage Service 824 on the Provider Network 1100, and the Metrics, Analytics and Alarm Service

116 may be implemented via an assemblage of service provider-provided building blocks from Data Stream Service 1106, Event Driven Compute Service 1110, Metrics, Analytics and Alarm Service 1114, and/or Analytics, Search and Visualization Service 1116.

Embodiments of a de-centralized distributed RPA bot system implement authentication and authorization features via integration with and/or based on the security infrastructure (IAM Service 1120) of the Provider Network 1100 which extends a common identity and access management (and key management) across all the services used to implement the de-centralized distributed RPA bot system.

In some embodiments, a bot may require one or more keys for the bot to access a resource. For example, access to some network-based resources may be restricted to keyholders. In embodiments, the agent may be configured with one or more keys for the bot to use at runtime to access a protected resource, or the agent may be configured with one or more keys to be used to obtain the keys needed by the bot to access the restricted resource, at runtime, for example.

In embodiments, to increase re-usability of code across an organization, a system may implement a code artifact-based code architecture including a managed code artifact repository service 1126. The repository service may be configured to facilitate secure storage, publishing, and/or sharing of software packages used in a software development process. For example, core RPA bot capabilities (e.g., code libraries) may be published to a code repository (e.g., in-house, private, public, etc.) for re-use in other bots. In embodiments, task-specific code and the user interface and/or a frontend for the bot code is developed and stored at individual organization-level code bases.

In embodiments, a key management service (KMS) implements creation and management of cryptographic keys and controls key use across a wide range of service provider services and in applications such as the bots. In embodiments, KMS ensures that the build and deployment artifacts stored on the buckets are encrypted at rest, for example.

Example Computer System

Figure 12:
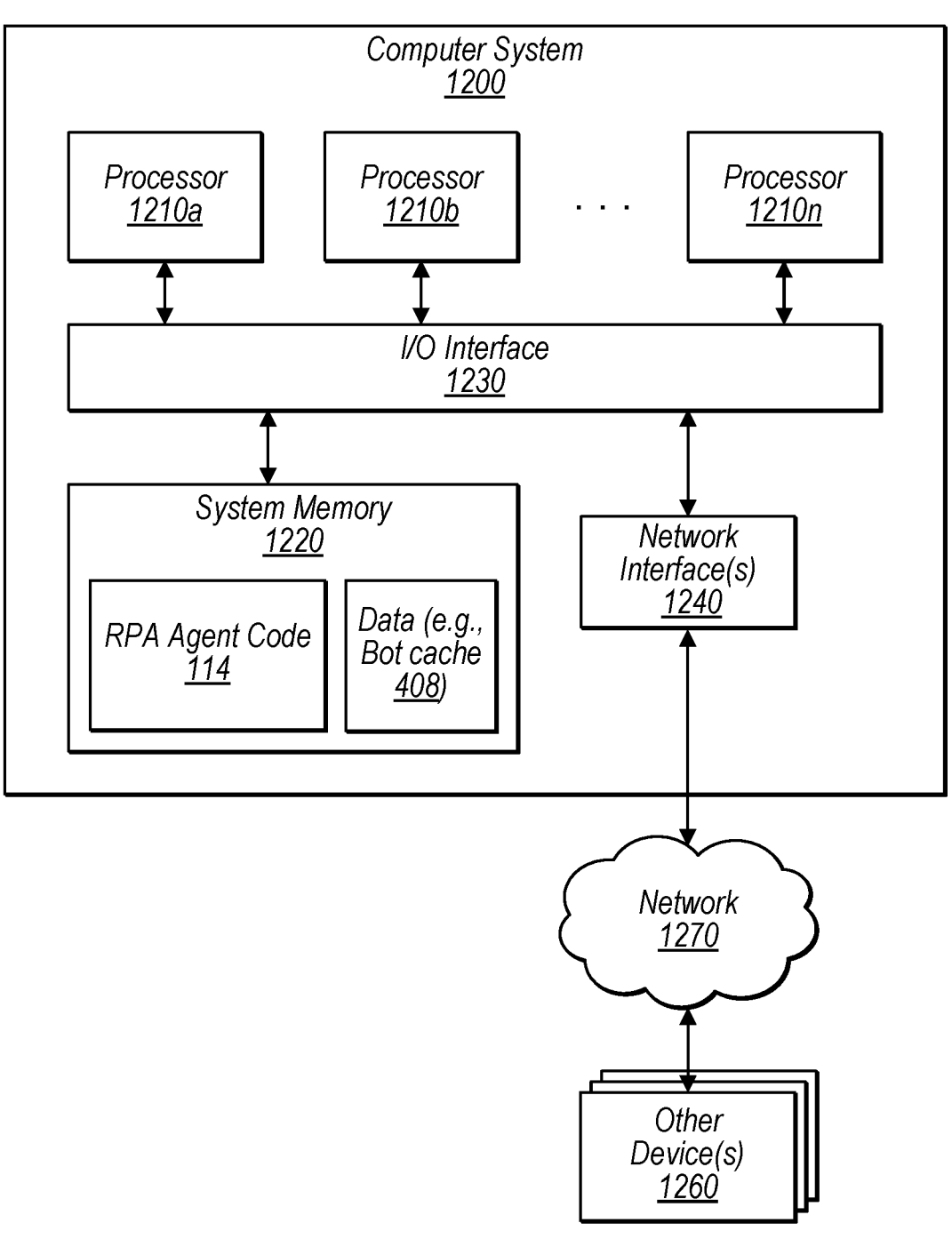
FIG. 12 is a block diagram illustrating a computer system configured to implement at least a portion of a system that implements de-centralized distributed RPA bots, according to various embodiments.

FIG. 12 is a block diagram that illustrates an example of a computer system, one or more of which may implement various components described and illustrated throughout the disclosure, including one or more components that implement a de-centralized distributed RPA bot system, according to embodiments.

Various portions of systems in FIGS. 1, 2A, 2B, 4, 7, 8A-B and 9-12 and/or methods presented in FIGS. 3, 5 and 6, described herein, may be executed on one or more computer systems similar to that described herein, which may interact with various other devices of the system.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1260, such as cursor control device, keyboard, audio device, and display(s). In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for an Identity and Access Management Service that implements persistent source values for assumed alternative identities may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1220 may be configured to store program instructions and/or data accessible by processor 1210. In various embodiments, system memory 1220 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a de-centralized distributed RPA bot system, are shown stored within system memory 1220 as a de-centralized distributed RPA bot system code 114 and data 408 (e.g., the cached bot executables and associated information, etc.), respectively. In some embodiments (not illustrated), the Code 114 may be the client-side code). In other embodiments, program instructions and/or data may be received, sent, or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network 1270 and/or a wireless link, such as may be implemented via network interface 1240. Program instructions may include instructions for implementing the techniques described with respect to any of the FIGs.

In some embodiments, I/O interface 1230 may be configured to coordinate I/O traffic between processor 1210, system memory 1220, and any peripheral devices in the device, including network interface 1240 or other peripheral interfaces, such as input/output devices. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 1200 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 1200. Multiple input/output devices may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

Memory 1220 may include program instructions (e.g., such as code 114), configured to implement embodiments of a de-centralized distributed RPA bot system as described herein, and data storage 408, comprising various data (e.g., bot executables, metadata, or other associated information) accessible by the program instructions 114. In one embodiment, program instructions 114 may include software elements of a method illustrated in the above figures. Data storage 408 may include data that may be used in embodiments described herein. In other embodiments, other or different software elements and/or data may be included.

Those skilled in the art will appreciate that computer system 1200 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., persistent source values for assumed alternative identities) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

What is claimed is:

1. A system, comprising:
a data storage system comprising an RPA repository for storing a plurality of robotic process automation (RPA) bots, wherein individual ones of the RPA bots comprise executable code for interacting with one or more application user interfaces to automate one or more processes;
a plurality of computers comprising respective processors and memory and configured to implement respective RPA agents, wherein individual ones of the RPA agents are configured to:
    access the RPA repository to discover new RPA bots or updates to RPA bots;
    download information for RPA bots to a local RPA bot data store;
    provide a user interface for browsing available RPA bots and for selecting one or more RPA bots for execution;
    in response to user input via the user interface selecting one of the RPA bots for execution, obtain an executable for the selected RPA bot and initiate local execution of the RPA bot;
    log one or more bot execution metrics for locally executed RPA bots and send the bot execution metrics to an analytics and alarm service; and
one or more computers comprising respective processors and memory and configured to implement the analytics and alarm service, wherein the analytics and alarm service is configured to:
    provide visualization data for bot execution metrics received from the RPA agents; and
    monitor the bot execution metrics received from the RPA agents for one or more alarms.

2. The system of claim 1,
wherein to access the RPA repository the individual ones of the RPA agents are configured to poll the repository upon startup for updates to the plurality of RPA bots stored at the repository; and
wherein to download information for RPA bots the individual ones of the RPA agents are configured to:
    read updated bot executables or updated bot information from the RPA repository based on results of polling the repository upon startup, and
    update the local RPA bot data store with the updated bot executables or updated bot information.

3. The system of claim 1,
wherein to obtain the executable for the selected RPA bot the RPA agent is configured to check the local RPA bot data store for the selected RPA bot, and responsive to not locating the selected RPA bot in the local RPA bot data store, download the selected RPA bot from the RPA repository.

4. The system of claim 1, wherein:
the RPA repository for storing the plurality of RPA bots comprises an object store, of a service provider network of a multi-tenant service provider, that uses unique key-values to store objects comprising the RPA bot executables;
the RPA agents are implemented by respective virtual machines hosted on computers of the service provider network, or by respective client computers external to the service provider network; and the analytics and alarm service to which the RPA agents send bot execution metrics is hosted on computers of the service provider network.

5. A method, comprising:

performing by individual ones of a plurality of computing devices:

polling, by a robotic process automation (RPA) agent executing on the computing device, a remote RPA repository of RPA bots to discover new RPA bots, or updates to RPA bots, stored at the RPA repository;

downloading, from the RPA repository to an RPA bot data store local to the RPA agent executing on the computing device, information for RPA bots;

providing, by the RPA agent executing on the computing device, a user interface for browsing available RPA bots and for selecting one or more RPA bots for execution; and obtaining, in response to selection via the user interface of one of the RPA bots for execution, an executable for the selected RPA bot and initiating local execution of the selected RPA bot, wherein local execution comprises execution local to the computing device on which the RPA bot is executing.

6. The method of claim 5, wherein said polling the remote RPA repository of RPA bots comprises polling a bucket at the RPA repository for information on available RPA bots.

7. The method of claim 5, further comprising:

performing said polling the remote RPA repository of RPA bots, wherein said polling is performed in accordance with one selected from:

in response to agent startup, periodically, or in response to a user input request for an update to the bot information.

8. The method of claim 5, wherein:

said polling the remote RPA repository of RPA bots comprises polling an index for the RPA bots stored in the remote RPA repository;

the method further comprises determining, based on the index, that a new RPA bot or an RPA bot update is available from the remote RPA repository; and said downloading information for RPA bots comprises downloading the new RPA bot or the RPA bot update determined based on the index.

9. The method of claim 5, further comprising:

populating, based on RPA bots stored in the RPA bot data store local to the RPA agent, the user interface provided by the RPA agent for browsing with locally-available RPA bots.

10. The method of claim 5, wherein:

the RPA repository comprises an object-based data store configured to store the RPA bots as objects in buckets;

the method further comprising:

receiving, by a publishing manager, an executable file for an RPA bot to be stored in a particular bucket in the repository, storing, by the publishing manager, the executable file for the RPA bot to the particular bucket, and updating, by the publishing manager, an index of RPA bots with an indication of the RPA bot stored in the particular bucket.

11. The method of claim 5, wherein:

the RPA repository comprises an object store, of a service provider network of a multi-tenant service provider, that uses unique key-values to store objects comprising the RPA bot executables;

the RPA agents are implemented by respective virtual machines hosted on computers of the service provider network, or by respective client computers external to the service provider network; and the method further comprises sending, by the RPA agents, bot execution metrics to an analytics and alarm service hosted on computers of the service provider network.

12. The method of claim 5, wherein the remote RPA repository comprises an object-based data store configured to store the RPA bots in buckets; and in response to requests for storage accesses directed to a particular one of the buckets, the RPA repository is configured to perform:

determining authorization for the storage accesses based on an evaluation of one or more security policies associated with an owner of the particular bucket, allowing authorized storage accesses of the particular bucket and preventing unauthorized storage accesses of the particular bucket.

13. The method of claim 5, further comprising:

logging, by the RPA agent, metrics associated with execution of the selected bot;

using, by the RPA agent, the logged bot execution metrics to generate a local report on bot execution performed via the agent.

14. One or more non-transitory computer-readable storage media storing program instructions that when executed on or across one or more processors cause the one or more processors to implement an RPA agent to execute on a computing device, the RPA configured to perform:

polling, by the RPA agent executing on the computing device, a remote RPA repository of RPA bots to discover new RPA bots, or updates to RPA bots, stored at the RPA repository;

downloading, from the remote RPA repository to a local RPA bot data store local to the RPA agent executing on the computing device, information for RPA bots;

providing, by the RPA agent executing on the computing device, a user interface for browsing available RPA bots and for selecting one or more RPA bots for execution; and obtaining, in response to selection via the user interface of one of the RPA bots for execution, an executable for the selected RPA bot and initiating local execution of the selected RPA bot, wherein local execution comprises execution local to the computing device on which the RPA bot is executing.

15. The non-transitory computer-readable storage media of claim 14, wherein to perform said obtaining the executable for the selected RPA bot the instructions cause the RPA agent to perform obtaining the executable for the selected RPA bot from the local RPA bot data store.

16. The non-transitory computer-readable storage media of claim 15, wherein to perform said obtaining the executable for the selected RPA bot the instructions cause the RPA agent to perform checking the local RPA bot data store for the selected RPA bot, and responsive to not locating the selected RPA bot in the local RPA bot data store, downloading the selected RPA bot from the RPA repository.

17. The non-transitory computer-readable storage media of claim 14, wherein individual ones of the RPA bots stored to the local RPA bot data store comprise executable code for interacting with one or more application user interfaces to automate one or more processes.

18. The non-transitory computer-readable storage media of claim 14, wherein the program instructions cause the RPA agent to perform:

sending batches of locally logged bot execution metrics to a network endpoint for a bot execution metrics data stream at an analytics and alarm service.

19. The non-transitory computer-readable storage media of claim 14, wherein the program instructions cause a local bot execution report generator of the RPA agent to perform:

generating an execution report that is based at least in part on one or more bot execution metrics for the selected one or more RPA bots; and storing the execution report to storage.

20. The non-transitory computer-readable storage media of claim 14, wherein to perform said polling the remote RPA repository of RPA bots, the program instructions cause the RPA agent to perform said polling in response to agent startup, periodically, or in response to a user input request for an update to the bot information.

\* \* \* \* \*